US005580013A

United States Patent [19]
Velke

[11] Patent Number: 5,580,013
[45] Date of Patent: Dec. 3, 1996

[54] ECONOMICAL CONSTRUCTION AND ASSEMBLY METHOD FOR A MODULAR PERMANENT ORBITING SPACE STATION

[76] Inventor: William H. Velke, P.O. Box 154, 277 Campbellville Rd., Campbellville, Ontario, Canada, L0P 1B0

[21] Appl. No.: 359,644

[22] Filed: Dec. 20, 1994

[51] Int. Cl.$^6$ .................................................... B64G 1/10
[52] U.S. Cl. ......................... 244/159; 52/81.4; 135/143; 135/123; 446/488; 446/476
[58] Field of Search ............................... 244/159, 158 R; 52/79.5, 79.4, 79.1, 81.4, 223.14, 223.1; 446/487, 488, 476; 135/143, 123, 128, 125, 126

[56] References Cited

U.S. PATENT DOCUMENTS

| | | | |
|---|---|---|---|
| 3,348,352 | 10/1967 | Cummings | 244/159 |
| 4,057,207 | 11/1977 | Hogan | 244/159 |
| 4,207,715 | 6/1980 | Kitrick | 52/81.4 |
| 4,792,108 | 12/1988 | Bull | 244/159 |
| 5,429,851 | 7/1995 | Sallee | 244/159 |

FOREIGN PATENT DOCUMENTS

| | | | |
|---|---|---|---|
| 0284688 | 10/1988 | European Pat. Off. | 244/159 |
| 0125697 | 5/1991 | Japan | 244/159 |

*Primary Examiner*—Andres Kashnikow
*Assistant Examiner*—Tien Dinh

[57] ABSTRACT

A method, compatible with existing re-usable space shuttle vehicles, for the fabrication and assembly of large modular orbiting structures in space providing gravity-free and artificial gravity environments, using a plurality of prefabricated, fully collapsible, multi-sided pod module enclosures from lightweight laminated material with significant structural integrity, transported into space in their high density storage mode, dispensed and expanded from a delivery apparatus and formed into voluminous structural enclosures by employing the use of a series of interior guide and tension cables, and with all such assembly work performed in a pressurized environment with little need for space suit activity.

24 Claims, 12 Drawing Sheets

ECONOMICAL CONSTRUCTION AND ASSEMBLY METHOD FOR A MODULAR PERMANENT ORBITING SPACE STATION

FIELD OF THE INVENTION

The present invention relates to the construction in outer space and more specifically to the delivery and assembly of modular components to a selected site in outer space for the construction of a permanent orbiting space station, which incorporates both gravity-free and artificial-gravity environments, and which is compatible with existing reusable space shuttle vehicles.

BACKGROUND OF THE INVENTION

Space stations are critically important to the advancement of mankind and are a major step towards commercialization and colonization of space. They will provide scientists with the necessary environments to achieve revolutionary scientific and technological breakthroughs and although it is difficult to predict all the benefits civilization may derive from the exploitation of manned orbiting space stations, their most important functions are well recognized.

Over the past decade the National Aeronautics and Space Administration (NASA) has been working on design proposals for the first permanently manned space station, but todate no practical method has been developed for the economical construction in outer space. NASA ground rules require the space station to be compatible with existing reusable shuttle vehicles and all structures and building components must fit inside the shuttle cargo bay. The shape of the cargo bay is more or less cylindrical with a diameter of approximately 15 feet and a length of approximately 60 feet.

It is further required that the space station is of modular design so as to easily facilitate expansion of its general layout and that the delivery of modules and components to complete a space station require a minimum of shuttle trips. Another important requirement is that construction and assembly of components on site is achieved without or at least with a minimum of "space suit" work hours, as this is recognized as a hazardous, high cost activity.

More recently, NASA contemplated a large scale space program, known as the "Freedom Space Station". This program proved to be extremely costly and budget constraints have halted its development.

It is still recognized however, that if such a space station could be constructed more economically, extremely lucrative technical and scientific advancements could be realized and it would therefore be most desirous to have available a practical, cost-effective design and construction method for a full size orbiting space station.

It is the object of the present invention to provide a significantly more economical method for constructing a space station at a selected location in space than any method known in the prior art.

It is another object of the present invention to provide a pre-fabricated pod enclosure module as one of the main components for the construction and assembly of said space station.

It is yet another object of the present invention to provide a pod enclosure module which occupies a minimum of space during its storage mode but provides a maximum usable interior volume in its deployed mode.

It is yet a further object of the present invention to provide a pod enclosure module which includes in its layout a series of strategically located structural folds and expansion joints, designed to compensate for the contractions and expansions of pod enclosure module surface areas due to the drastic temperature changes in outer space.

It is yet another object of the present invention to provide a storage and deployment apparatus fitted within the cargo bay of a space shuttle craft to deliver and dispense said pod enclosure modules to and at the site location in space, and to provide a pressurized work environment for the astronauts to lock the deployed pod modules into position as part of the construction procedure.

It is yet a further object of the present invention to provide a pod module dispensing system which uses a number of cables to guide and form a series of connected pod modules into a pre-designed shape and to provide the necessary tension to lock the pod module assembly into a solid structure.

It is yet another object of the present invention to provide a system of delivery and assembly of all components required to substantially construct the entire enclosure of a space station and deliver all components in a minimum of trips of a space vehicle.

SUMMARY OF THE INVENTION

Thus, in accordance with the presently preferred embodiment, there is disclosed an economical method for constructing a large pressurized structural enclosure in space.

In this method, a series of pre-fabricated, lightweight pod modules are collapsed into a space efficient storage mode, fitted into the delivery bay of a space shuttle craft and transported into orbit. There, said modules are expanded from their storage mode to their operational mode and assembled into a voluminous rigid structure.

Such structure is designed to provide firstly; a centrifugally induced artificial gravity environment throughout its large circularly arranged rotating pod ring and spoke layout, which is used for Living Quarters and for conducting activities which require various degrees of gravity, and secondly; a gravity free stationary non-rotating environment, which is used as an orbiting Service Station, wherein shuttle crafts and other space vehicles and satellites can be repaired, refurbished and re-deployed.

The Service Station portion of the space station is connected to the rotating pod ring and spoke structure via an air-tight sleeve joint, fitted to a pod ring hub cylinder which is located in an earth directional fixed position. This arrangement provides the space station with a high degree of gyroscopic stability, which will aid in maintaining the space station in a constant fixed position.

This general space station layout and its orbital placement is designed to specifically protect the large retractable entrance port, through which space shuttles and other space vehicles are docked into the Service Station cavity for repairs. This entrance port is a very flexible structure and quite vulnerable to space damage. By placing it in a direction towards earth, this entrance port is completely out of the paths of micro meteorites and other space debris and fully protected against any such possible damage.

The task of assembling a plurality of modular pods ejected from the storage tube on site in space, to be formed into a pre-designed structural configuration, is made extremely easy by using a novel guide cable and tension cable arrangement, and can be carried out by a few astronaut construction workers in a "shirt sleeve" environment.

This is achieved by having the pod module storage tube, which secures the pod modules during their storage mode inside the shuttle bay, connected with the shuttle cockpit and thereby fully pressurized.

Furthermore, the pod modules in their storage mode are fitted over the storage tube completely sealed, and therefore, when the shuttle bay doors are opened at the space site and the storage tube is moved into its dispensing position, all pod modules ejected from the storage tube may therefore expand to include a pressurized interior environment.

Because of the guide and tension cable arrangement, the necessary "hands on" labor required to expand, form and stabilize each pod module in its final location and open mode, needs to be performed only from the interior of each module structure and no "space suit" activity is required.

The cable arrangement operates as follows: In order to shape a continuation of pod modules into a circular structure, a series of guide cables, of a length to form a circle of a desired diameter, are located through the connecting walls of the required number of pod modules, reaching from the end wall of the first module, through the dividing walls of all connecting pod modules, to the end wall of the last module, thereby, when the two end walls are connected, forming a giant necklace of expanded pod modules. A series of mechanical stops are provided at specific locations along the entire length of guide cables, against which the pod module dividing-or end walls come to rest when the pod modules are opened into their final operational mode. The locations of such stops along the guide cables and their relation to each other will influence the final shape of the opened pod module, and a variety and combination of pod module dimensions may be achieved along this predetermined structural layout.

The tension cables are located, one in each pod module, in such a way, that they follow the main hinged seam, which combines the two pod module halves into one pod enclosure. Each tension cable is placed through a series of sleeves or rings attached along the inside of the main hinged pod module seam in a closed loop, and when such cable is shortened, it will move the pod module end- or dividing walls outward against the guide line cable stops, creating tension across all pod module walls and structural folds and thereby increasing the structural strength of each pod module. Furthermore, if such tension cable includes a mechanical provision for its contraction and expansion, it will aid the pod module expansion joint folds in being more effective.

A series of circularly arranged pod module layouts may be combined to form a variety of cylindrical- or cone shaped space structures, creating enclosures of greatly increased dimensions These and other advantages and features of the present invention, as well as its method of operation, its various components and the general ease of assembly thereof, will become more apparent with the following detailed description, the claims and the accompanying drawings described herein below.

DETAILED DESCRIPTION OF A PREFERRED EMBODIMENT

Referring now to FIGS. 1 through 9 of the drawings, which show one of the objects of the present invention, comprising a fully collapsible, modular, prefabricated multi-sided pod enclosure, fabricated from lightweight, laminated material. Such pod module occupies a minimal area when in its storage mode, but will create a structural enclosure of great volume when deployed into its open mode. The ratio of space occupied by such a pod module in its storage mode versus its deployed open mode, using a wall thickness of 10 mm, is approximately 1:250. The preferred configuration of the pod module 1ab/c shown here consists of a 26 sided enclosure. However, any multi-sided module, incorporating at least an eight sided surface, will be suitable as an add-on module, but accordingly incorporating more or less desirable structural properties.

Figure 3:
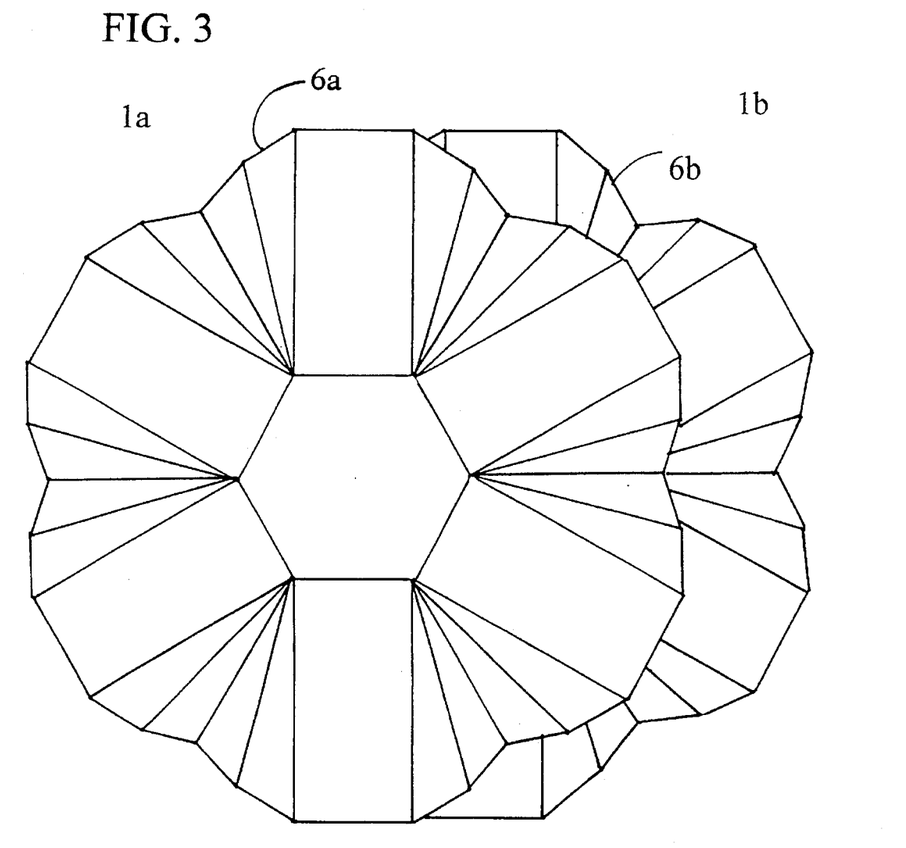
FIG. 3 is a front elevational view of two halves of a pod module in their two dimensional state, prior to being attached to each other.
Figure 4:
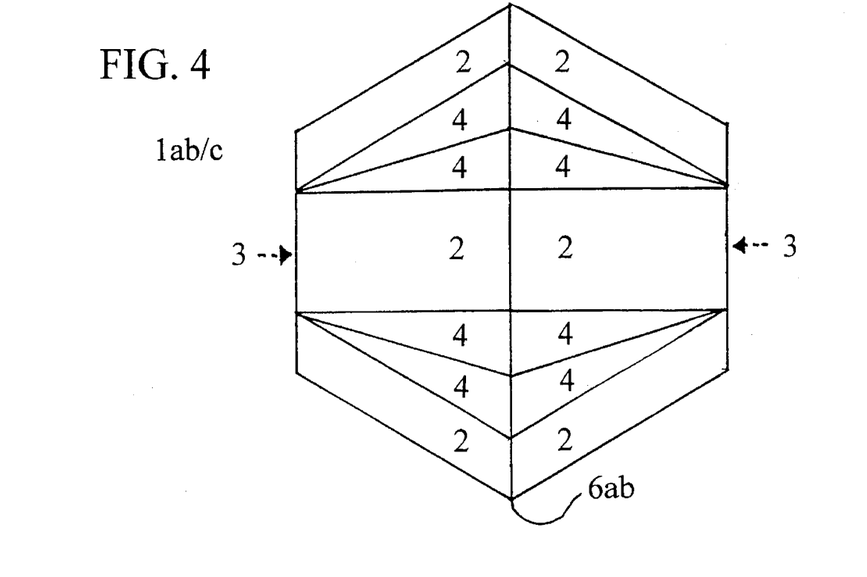
FIG. 4 is a side elevational view of the two halves of a pod module as shown in FIG. 3, but attached to each other and in their three dimensional state, with their surfaces folded along their various hinged fold lines.

The preferred pod module, as indicated in front elevation view in FIG. 3, comprises two identical, two dimensional parts 1a and 1b, hinged and sealed together at their perimeter edges 6a and 6b, thereby locking them into structural engagement.

Figure 1:
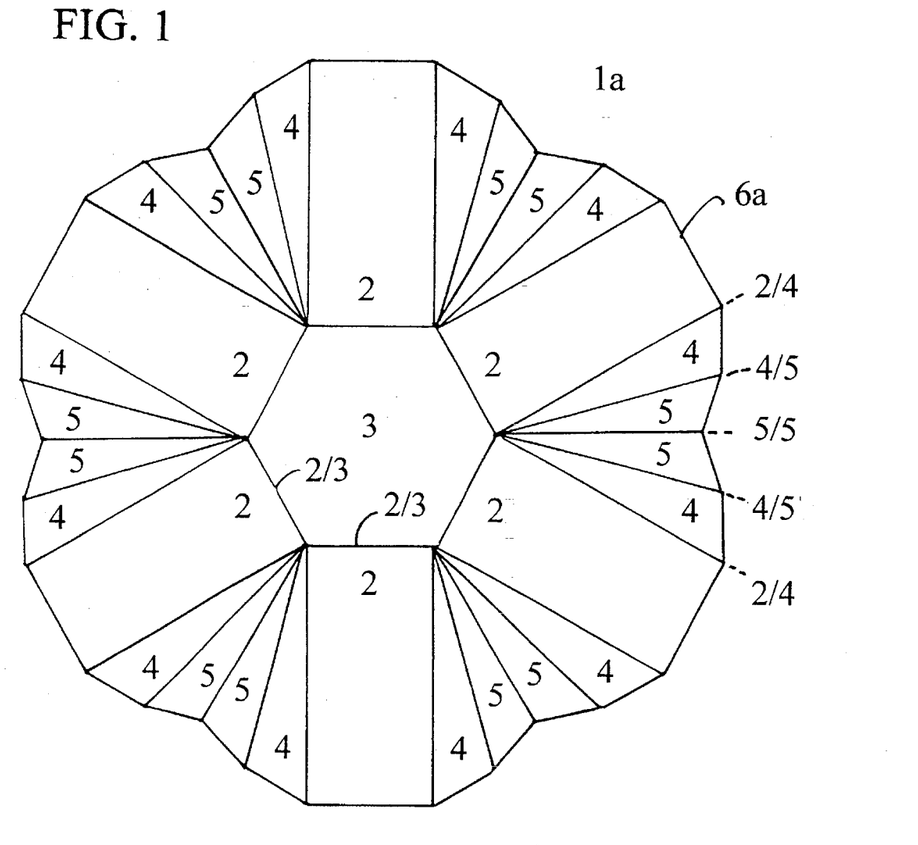
FIG. 1 is a front elevational view of one half of a pod module in its two dimensional state, according to the present invention, showing a series of hinged fold lines.

Each such identical, two dimensional pod module part incorporates a series of sealed fold or hinge lines, 2/3, 2/4, 4/5, and 5/5, which divide each such pod module part into the following separate but connected surface areas: one hexagon area 3, six rectangular areas 2, twelve triangular areas 4 and twelve triangular areas 5, all as indicated in front elevation view in FIG. 1

Figure 2:
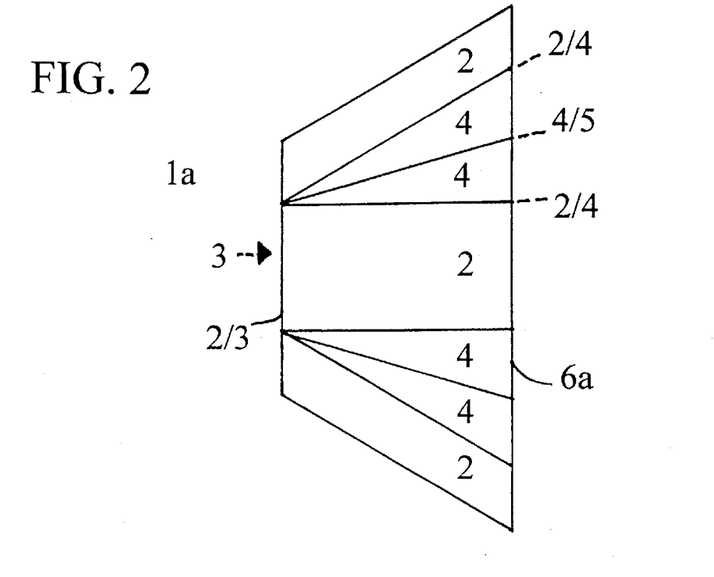
FIG. 2 is a side elevational view of one half of a pod module as shown in FIG. 1, but in its three dimensional state, with its surface folded along its various hinged fold lines.

In FIG. 2 is shown, in a side elevational view, the shape achieved by folding a two dimensional module part 1a into a three dimensional shape, comprising an open structure.

This three dimensional open structure may then be expanded into a three dimensional closed interior structure 1ab/c, by connecting perimeter edges 6a and 6b, folding the pod module parts along the fold lines 2/3, 2/4, 4/5, and 5/5, as indicated, folding each pair of surface areas 5 to face each other, locating the resulting six structural folds, or expansion joints 55, towards the interior of the enclosure, and spreading the two hexagon shaped surface areas 3 away from each other in opposite directions. This will result in forming a multi-sided pod module structure 1ab/c, as shown in side elevational view in FIG. 4.

Figure 5:
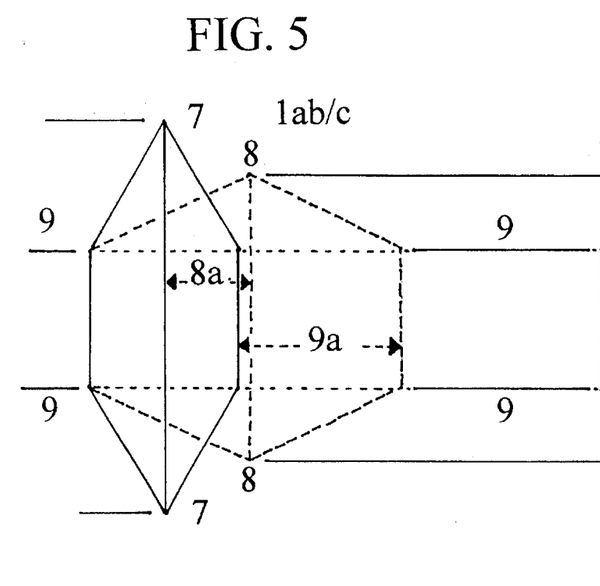
FIG. 5 is a side elevational view of a three dimensional, complete pod module, shown in its partially open and fully open modes.

Such closed interior pod module is a flexible structure without the engagement of a novel guide cable and tension cable fastening arrangement, and FIG. 5 shows, in side elevational view, how some of the pod module dimensions change during contraction 1ab/b and expansion 1ab/c of the structure. Dimension 9, which signifies the dimensions of the hexagon end walls, remains constant during the change, as indicated by arrow 9a, while dimensions 8 change to dimensions 7, when moved as indicated by arrow 8a.

Figure 6:
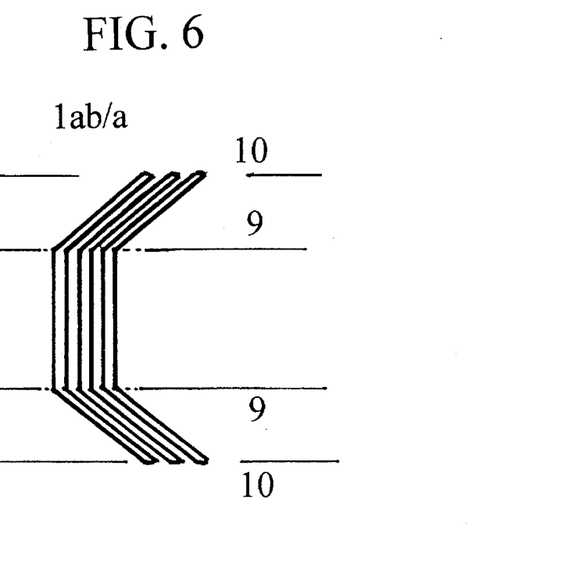
FIG. 6 is a side elevational section view, showing a number of pod modules nested in their storage mode.
Figure 7:
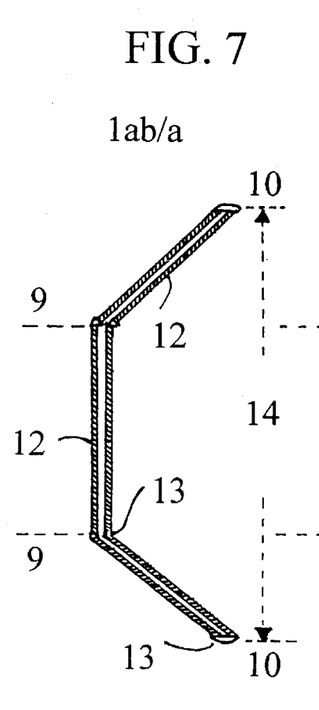
FIGS. 7, 8 and 9. show the variance of overall dimensions of a pod module from its storage mode, through its opening mode to the fully deployed mode.
Figures 8, 9:
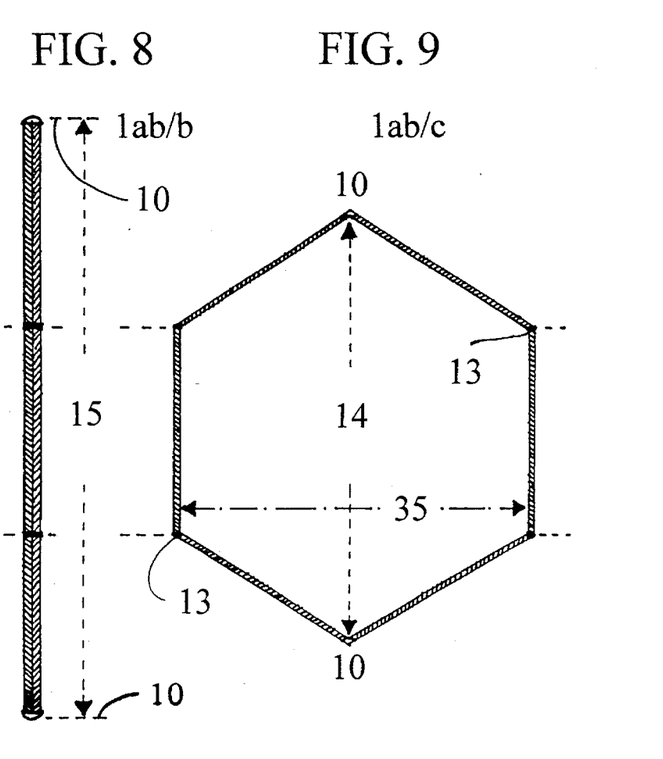

This flexibility allows the pod module structure to take on various shapes, from its inverted storage mode 1ab/a to its fully opened deployed mode 1ab/c, occupying various degrees of space and volume, which, as will be further demonstrated, will be beneficial when constructing various space station configurations, and in FIG. 6 is shown, in side elevational section view, a number of pod modules in their storage mode 1ab/a, nested into each other in an extremely space saving arrangement, with reference points 9 indicating the outline of the hexagon end walls and 10 indicating the location of the seam line 6ab during such storage mode. When collapsed in this fashion, a large number of pod modules may be fitted into the cargo bay of a space shuttle craft, allowing for a very economical delivery of pod modules to a construction site in outer space A more precise transformation of a pod module shape during its various stages of deployment is illustrated in FIGS. 7, 8 and 9. In FIG. 7 is shown, in elevational section view, a collapsed pod module, in its typical storage mode, with its wall sections 12 hinged along fold lines 13, and perimeter edge seams 6ab at reference 10 located at a distance 14 from each other. In FIG. 8 is shown, in elevational section view, a pod module in its transitional stage, before forming any voluminous, closed interior, at which stage perimeter edge seams 6ab at reference 10 are located at their farthest distance 15 apart during any of the transitional modes. In FIG. 9 is shown, in elevational section view, a pod module, in its fully deployed stage, wherein perimeter edge seams 6ab at reference 10 are located again at a distance 14 from each other. During these various transitions, reference points 9, representing the dimensions of the pod modules hexagon end walls 3, have remained constant as far as their vertical locations are concerned, but in plan have moved according to the reference points as indicated in FIG. 5 with arrow 9a.

Figure 13:
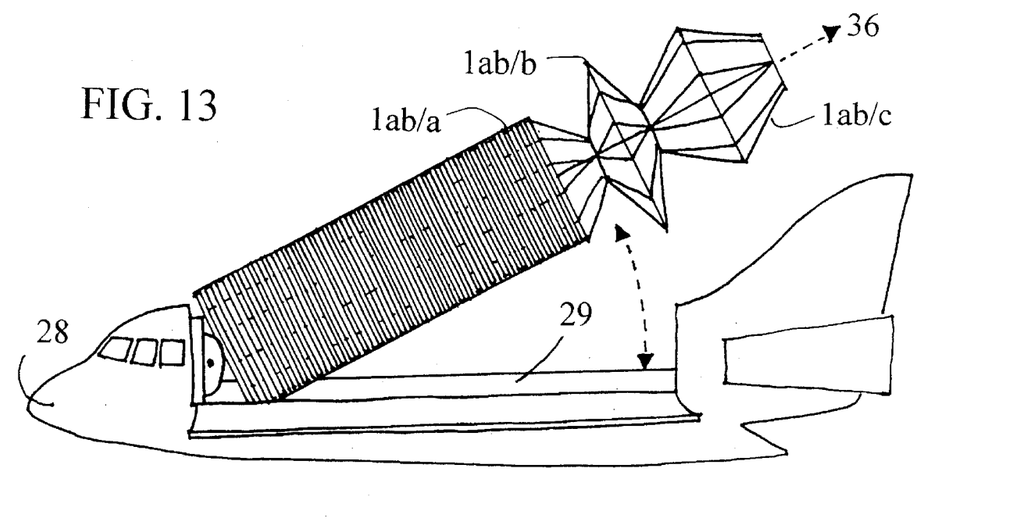
FIG. 13 is a side elevational view of a space shuttle craft with its cargo bay doors open and a fully loaded storage tube dispensing pod modules.

Referring now to FIGS. 10 to 17 of the drawings, which show the general method of construction and assembly of the space station modules, and the delivery apparatus of the present invention, reference numeral 28 indicates a rocket-powered space ascent vehicle, representative of the space shuttle developed and operated in the USA under the administration of the National Aeronautic and Space Administration (NASA). Operatively located within the cargo bay 29 of such space vehicle 28 is the pod module storage and delivery apparatus 19. Such apparatus extends generally along the length of the cargo bay 29 of the space shuttle vehicle 28 and is used in position 19a for carrying pod modules in their storage mode 1ab/a into space, and, when arrived at the space site, in position 19b, for dispensing and deploying the pod modules 1ab/c into their pre-designed configuration, as shown in FIG. 13.

Figures 10, 11, 12:
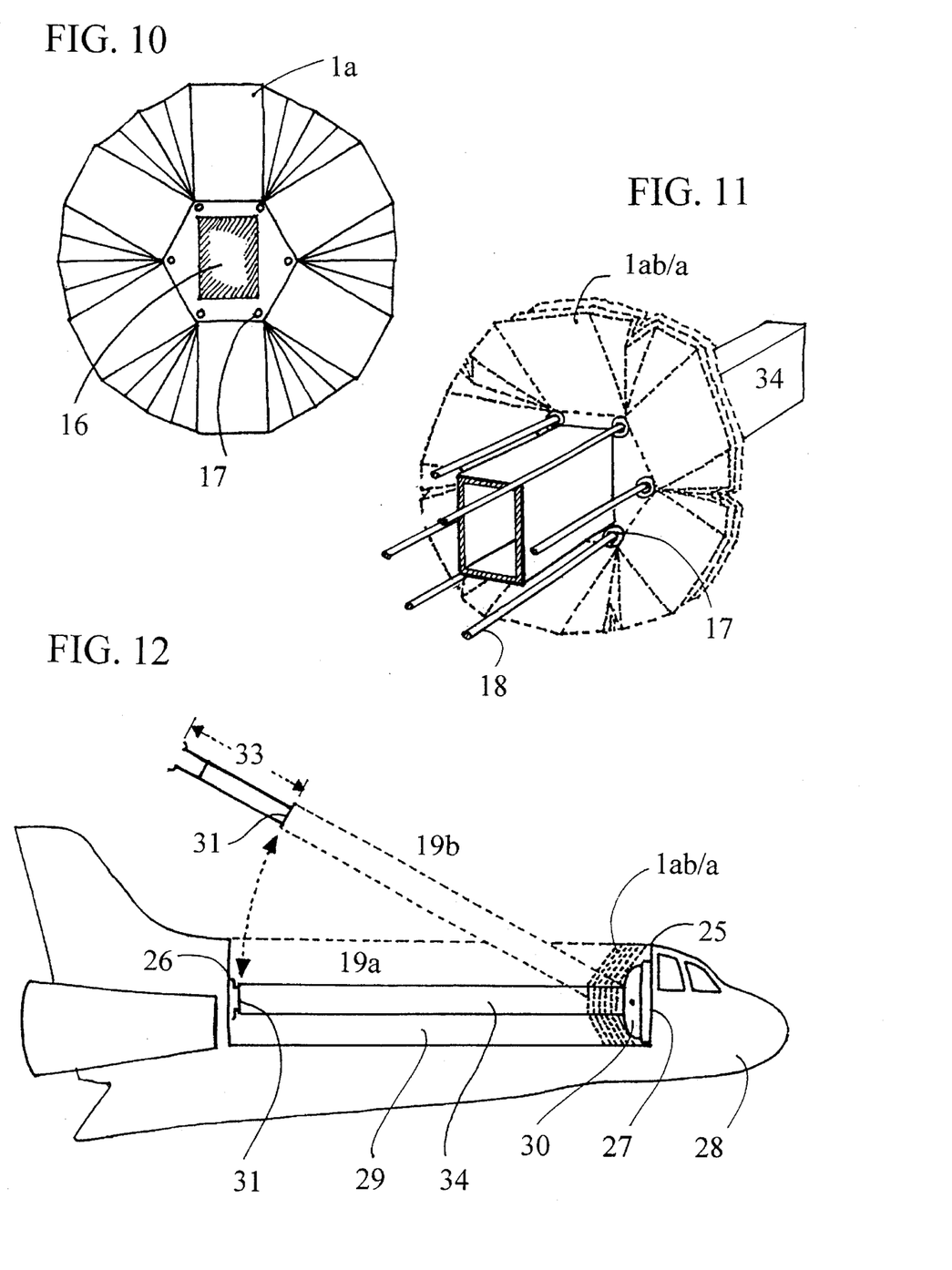
FIG. 10 is a front elevational view of a two dimensional half of a pod module, showing the location and opening for the storage tube and the locations and openings for the guide cables.
FIG. 11 is an isometric view of a portion of the storage apparatus, with a number of pod modules fitted onto the tube in their storage mode.
FIG. 12 is a side elevational view of a typical space shuttle craft showing the cargo bay and the location of the pod module storage apparatus in its storage- and dispensing positions.

The delivery apparatus 19 therefore comprises an elongated rectangular tube 34, having a first end 30 and a second end 31, as indicated in FIG. 12. The exterior dimensions of tube 34 relate to the dimensions of the opening 16 located in the end and dividing walls 3 of the pod modules, as shown in FIG. 10. The first end 30 of the tube 34 is attached to a suitable mechanism 27 which is able to raise the tube, including the stored pod modules, out of the storage position 19a to its dispensing position 19b. Such first end 30 is further connected, by way of an entry port, to the space shuttle flight cabin at 25, adapting its pressurized environment. The second end 31 of the tube 34 is closed and comprises an exit port, which may be employed to enter the pod modules' interior for their deployment and assembly. Said second tube end 31 further includes a hydraulic or electric device 32 which is able to operate along a direction as indicated by arrows 33, for the purpose of assisting with the expansion of each pod module from its storage position 1ab/a to its deployed position 1ab/c. Such hydraulic or electric device should have the capability of expanding in direction 33 for at least the distance that the pod module dividing walls 3 must be apart, when forming the fully deployed pod module enclosure 1ab/c, as shown in FIG. 9 through distance 35.

Figure 16:
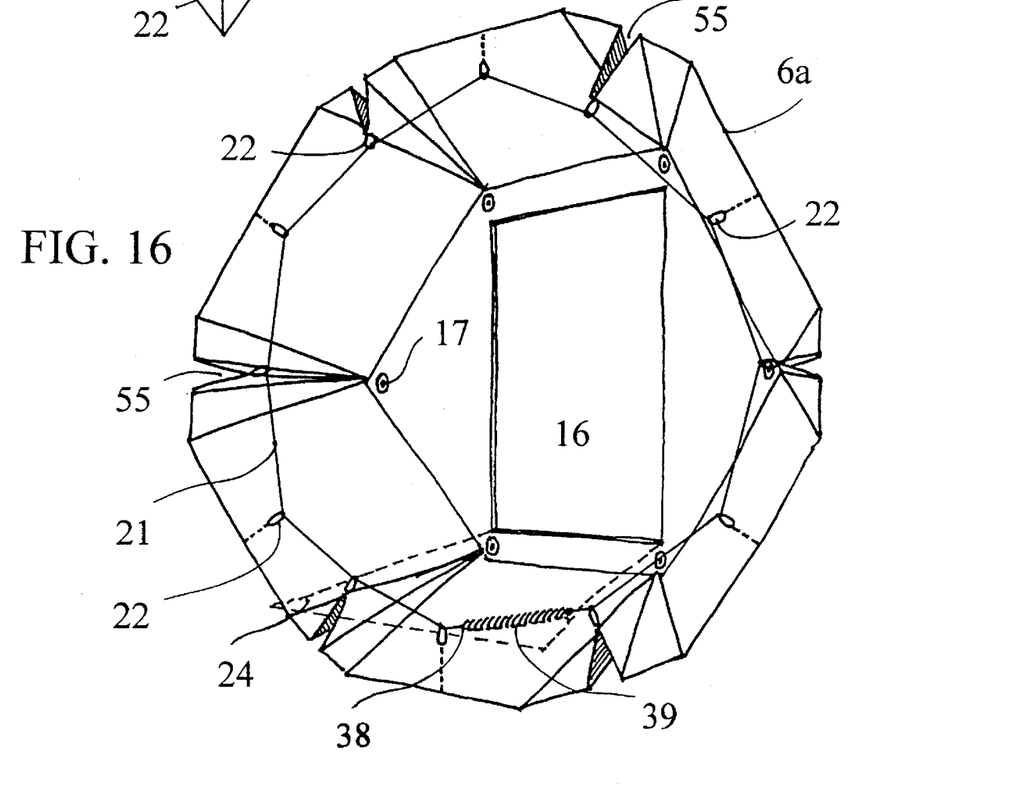
FIG. 16 is an isometric view of the interior of one half of a pod module in its three dimensional form, showing the location of the structural expansion folds and the tension cable arrangement.

The construction and assembly of a plurality of pod modules into a solid structure in space is further simplified through the employment of a series of guide cables and tension cables, and in FIG. 10 and 16 are shown a number of guide cable sleeves 17, located at strategic locations within each pod module dividing wall, through which sleeves said guide cables 18 are placed, as illustrated in FIG. 11. The length of each guide cable and the difference in length between the various guide cables in relation to each other, will be instrumental in forming the shape and arrangement of the space station structure.

Figure 14:
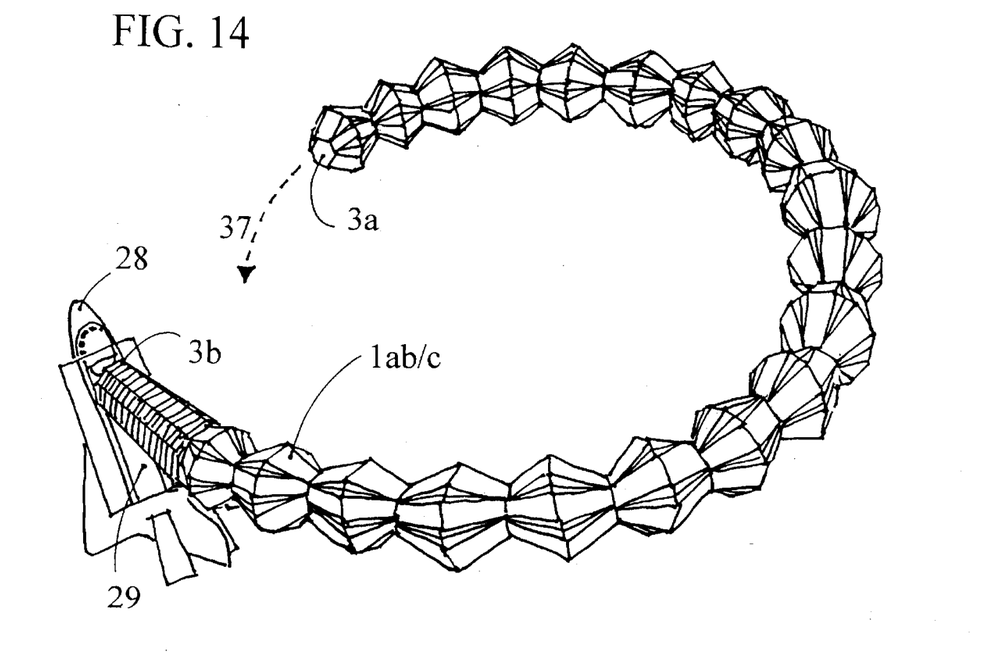
FIG. 14 is an isometric view of a shuttle craft in outer space, dispensing a string of pod modules.
Figure 17:
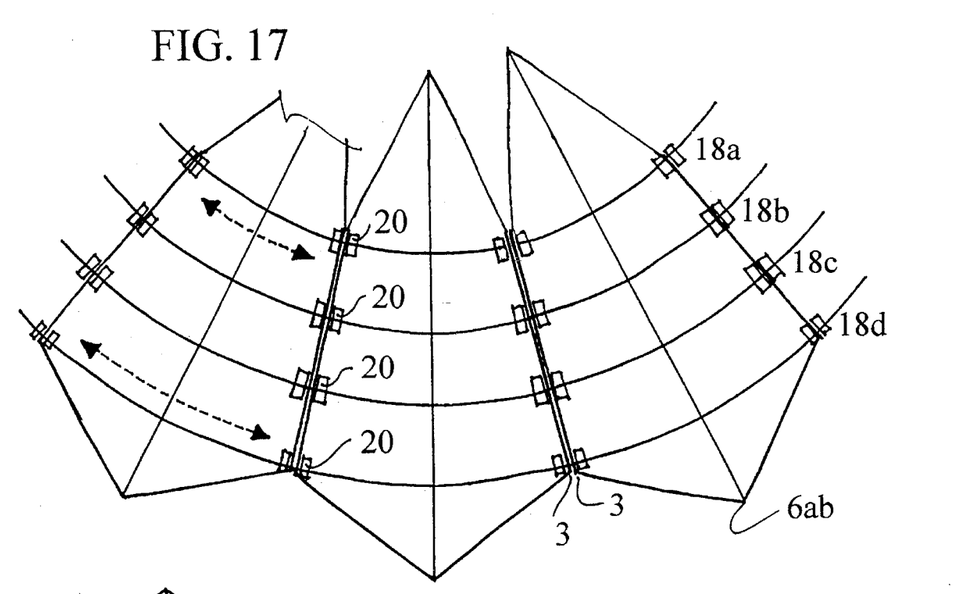
FIG. 17 is a sectional view in plan, showing the layout of a portion of a circular pod module arrangement, showing the placement of guide cable stops to achieve a curved structure.

The employment of guide cables of identical lengths would therefore result in an arrangement of pod modules assembled in a straight row, as shown by arrow 36 in FIG. 13, while the shaping of a circular arrangement of pod modules would require shorter guide cables on the inside radius location of the pod module arrangement, and longer guide cables on the outside radius location of the pod module arrangement, as illustrated in FIG. 17, with cable 18a being the shortest, cable 18b being the next shortest, cable 18c being longer again and cable 18d being the longest cable. When dispensing assembled pod modules 1ab/a from the storage apparatus 19, FIG. 14 shows that, when creating a circular pod module arrangement, on completion of the contemplated structure, the first dispensed pod module will automatically return to the location of the last dispensed pod module by completing the circle as indicated by arrow 37. This will again simplify the final connection of the two end walls 3a and 3b of the circular pod module arrangement into forming a completed circle, as shown in FIG. 14. All this construction activity may be carried out from inside the pod modules in a pressurized environment.

Figure 15:
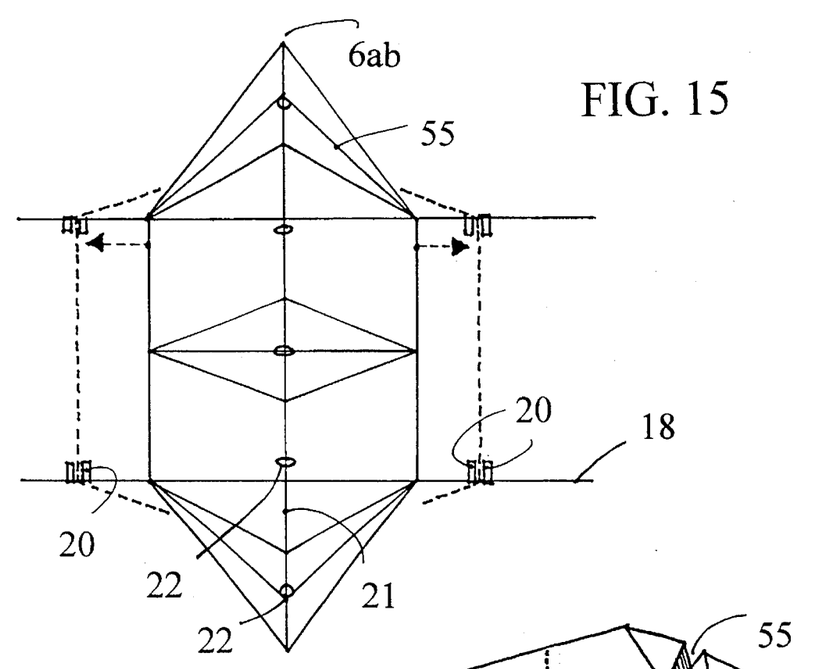
FIG. 15 is a side elevational view of a pod module in a semi-open state, showing locations of the tension cable and the guide cables with their stops.

The guide cable stops 20, as shown in FIG. 15 and 17, are designed to be firmly attached along guides cable 18, at any desired location, and are required to anchor the pod module dividing walls 3 at specific locations, and to assist, in conjunction with the tension cable 21 as shown in FIGS. 15 and 16, with securing each pod module 1ab/c in its deployed position and preventing same from collapsing back into their original storage mode. The tension cable 21, depending on the amount of tension applied in its assembly, further assists in providing each pod module with a great deal of structural integrity as well as expansion flexibility. This is achieved by locating said tension cable 21 along the general direction of pod module seam 6ab, and locating said tension cable through a series of rings or sleeves 22 placed along the pod module seam 6ab and at the point of joining of structural folds 55, as shown in FIG. 16.

The tension cable may be equipped, at its connecting location 38, with a mechanical tension device such as a tension spring 39, as shown in FIG. 16, which will assist the structural expansion joint folds 55 in providing more expansion flex to the overall surface of the space station structure during severe temperature changes in space.

A further structural component of the guide cable and tension cable arrangement is the floor panel component 24, as shown in FIG. 16, where such floor panel component matches the opening 16 in dividing walls 3, which is required to accommodate storage tube 34. Two such floor panel components when folded out and attached to each other end to end, will provide the necessary level flooring for each pod module in its expanded mode 1ab/c, and in conjunction with the adjacent structural folds 55 and the adjacent guide cables 18 adding to the structural strength of the pod module enclosure, when such floor panel components 24 are securely attached to said adjacent guide cables 18.

Figure 18:
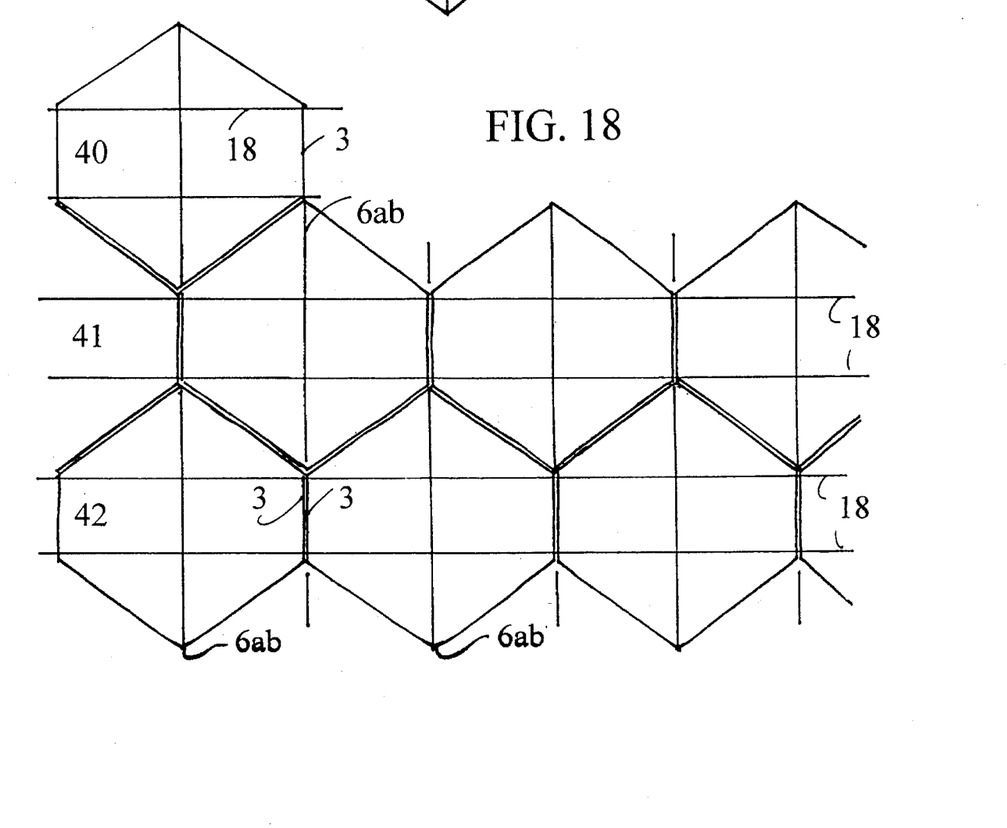
FIG. 18 is a front elevational view of a portion of a number of equal diameter pod module rings fitted together to form a cylindrical structure.
Figure 19:
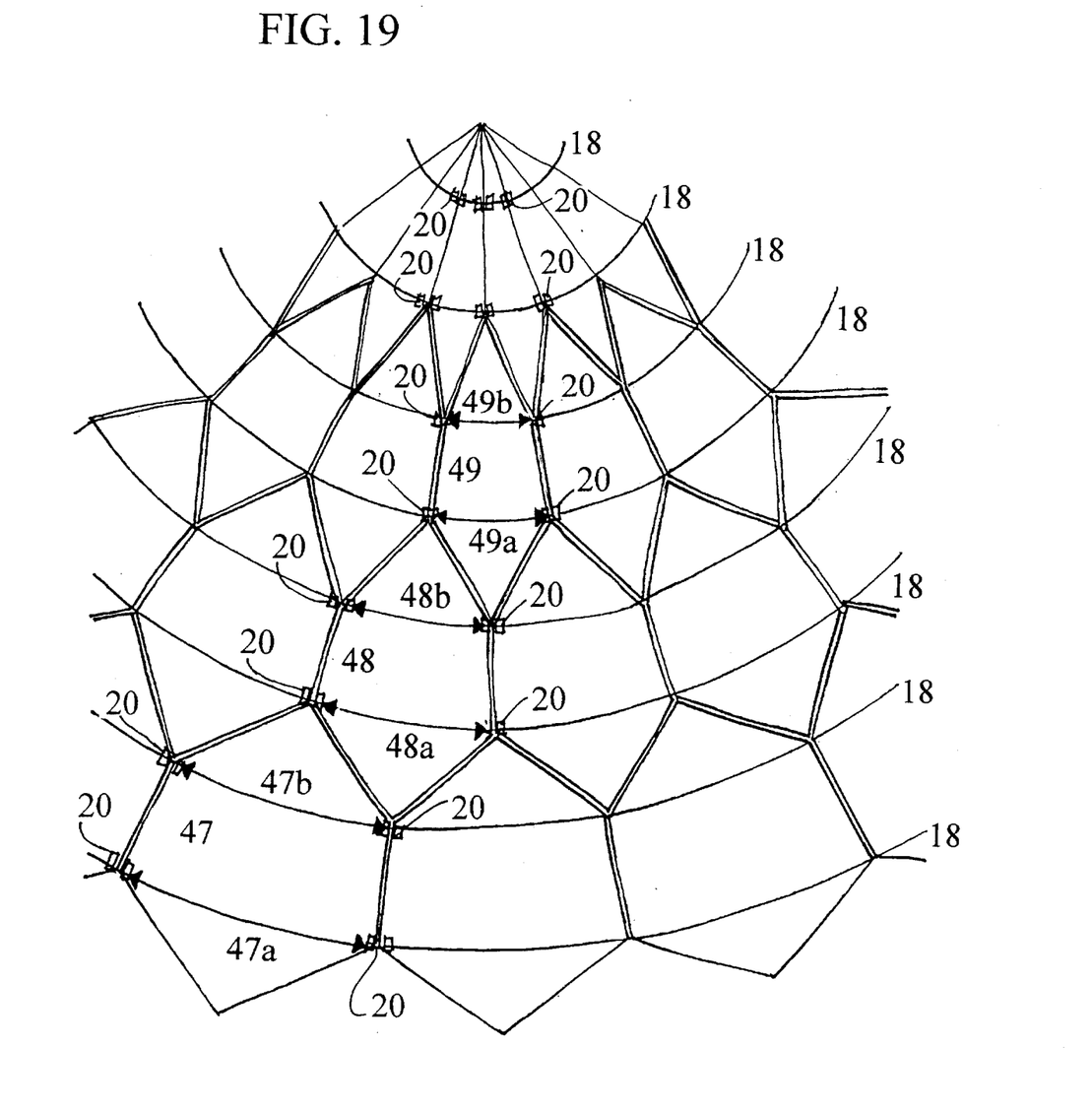
FIG. 19 is a plan view showing a portion of a number of pod module rings with reducing diameter forming a conical structure.
Figures 20, 21:
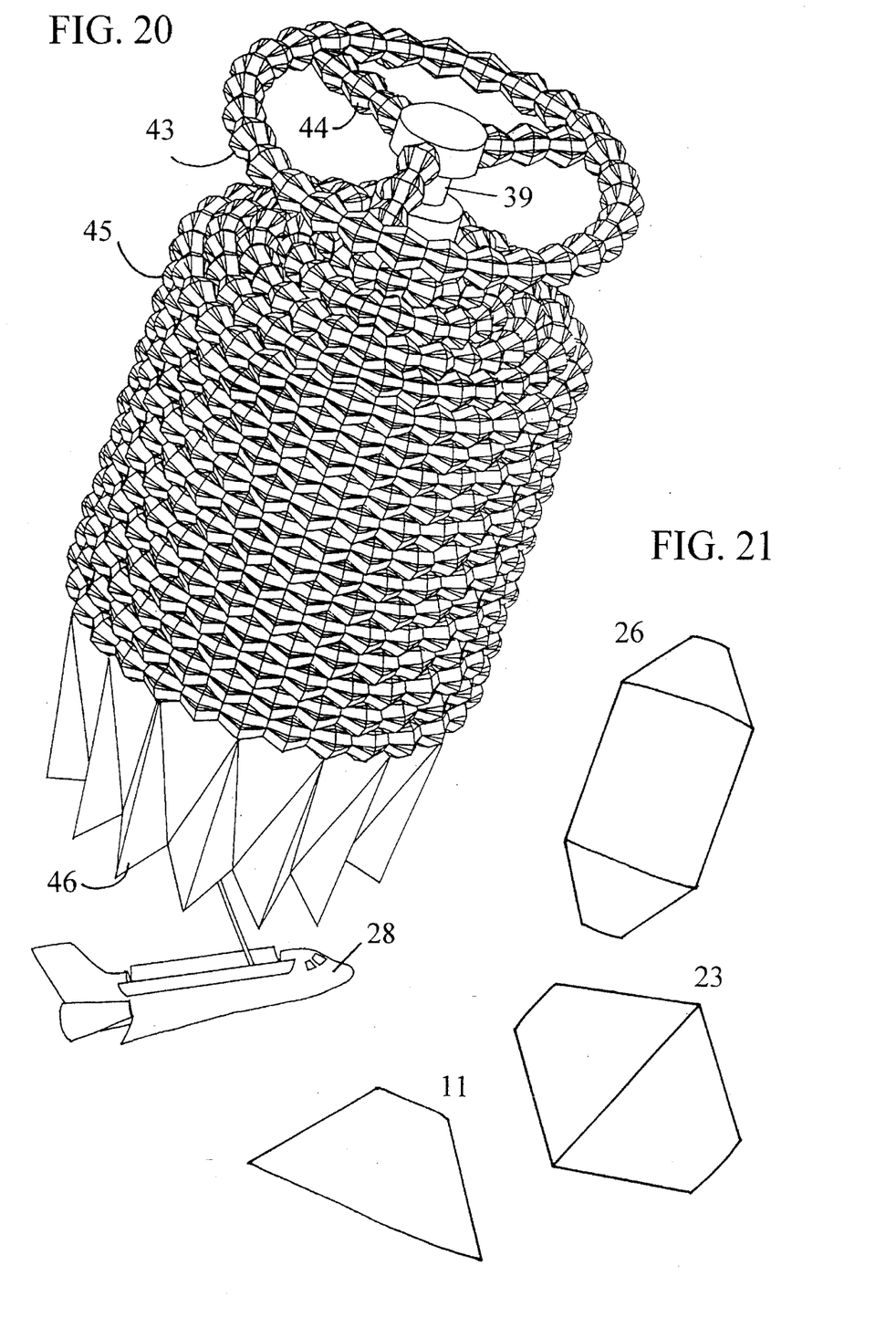
FIG. 20 is an isometric view of a fully assembled space station in outer space.
FIG. 21 is a view of various other structural shapes assembled from an array of pod modules.

Referring now to FIGS. 18 to 22, there are shown a variety of space station configurations that may be constructed when employing a plurality of pod modules of the present invention. In FIG. 18 is shown, in elevational view, how a series of pod modules 1ab/c fit against each other, assembled in rows 40, 41, 42, and how the abutting pod module dividing walls 3 align with seams 6ab of such rows of pod modules, when seen in this view. FIG. 19 illustrates the arrangement of a plurality of pod modules, viewed in plan, forming a partial shape of a cone, or a flat disc, wherein the rows of enclosure modules indicated as 47, 48, and 49 are spaced in their proportionate relations through the location of guide cable stops 20, establishing dimensions 47a, 47b, 48a, 48b, 49a and 49b. FIG. 20 shows an isometric view of a space station, consisting of a rotating ring of pod modules 43 with its spoke arrangement 44, which is attached by way of an airtight sleeve 39 to a stationary, cylindrically shaped service station 45 with its large entrance port 46 in an open position to dock a space shuttle craft 28. FIG. 21 shows an isometric view of a number of different space station shape alternatives, a single cone 11 a double cone 23 and a cylindrically shaped structure with conical ends 26, all fabricated from a plurality of pod modules.

Figure 22:
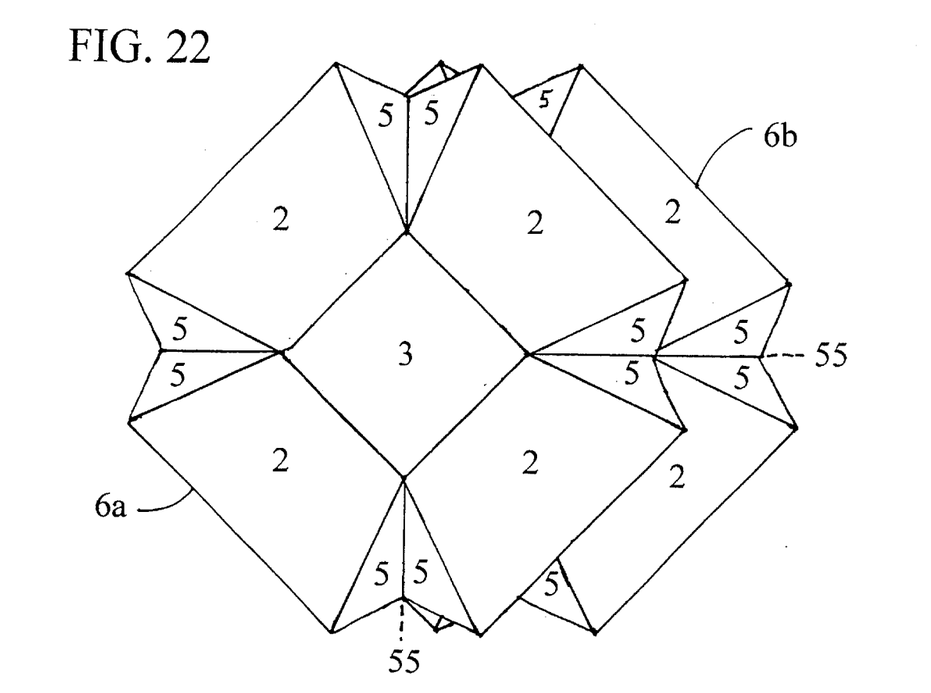
FIGS. 22, 23, and 24 is a view of an alternate pod module shape that may be employed for the assembly of structures in outer space, thereby creating the option to use either one particular shape, or a mixture of shapes in order to achieve certain structural results.
Figure 23:
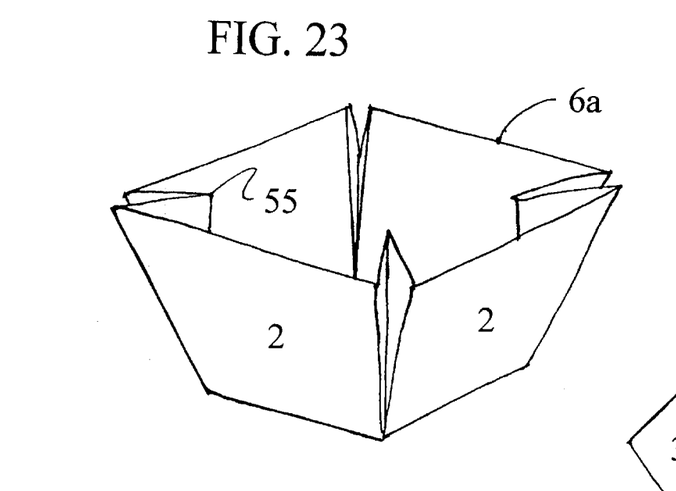
Figure 24:
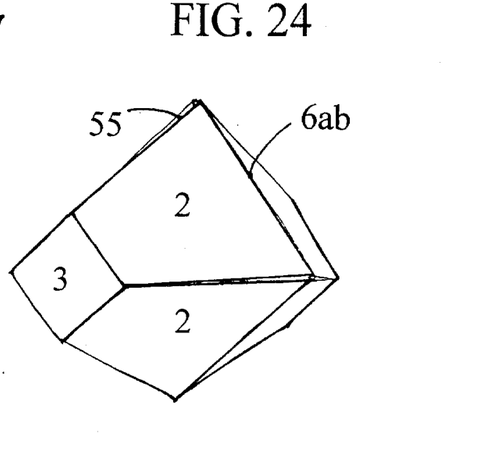

FIGS. 22 to 24 show a further pod module shape, this time a twelve sided version, to demonstrate how other pod module configurations may be employed.

Figure 25:
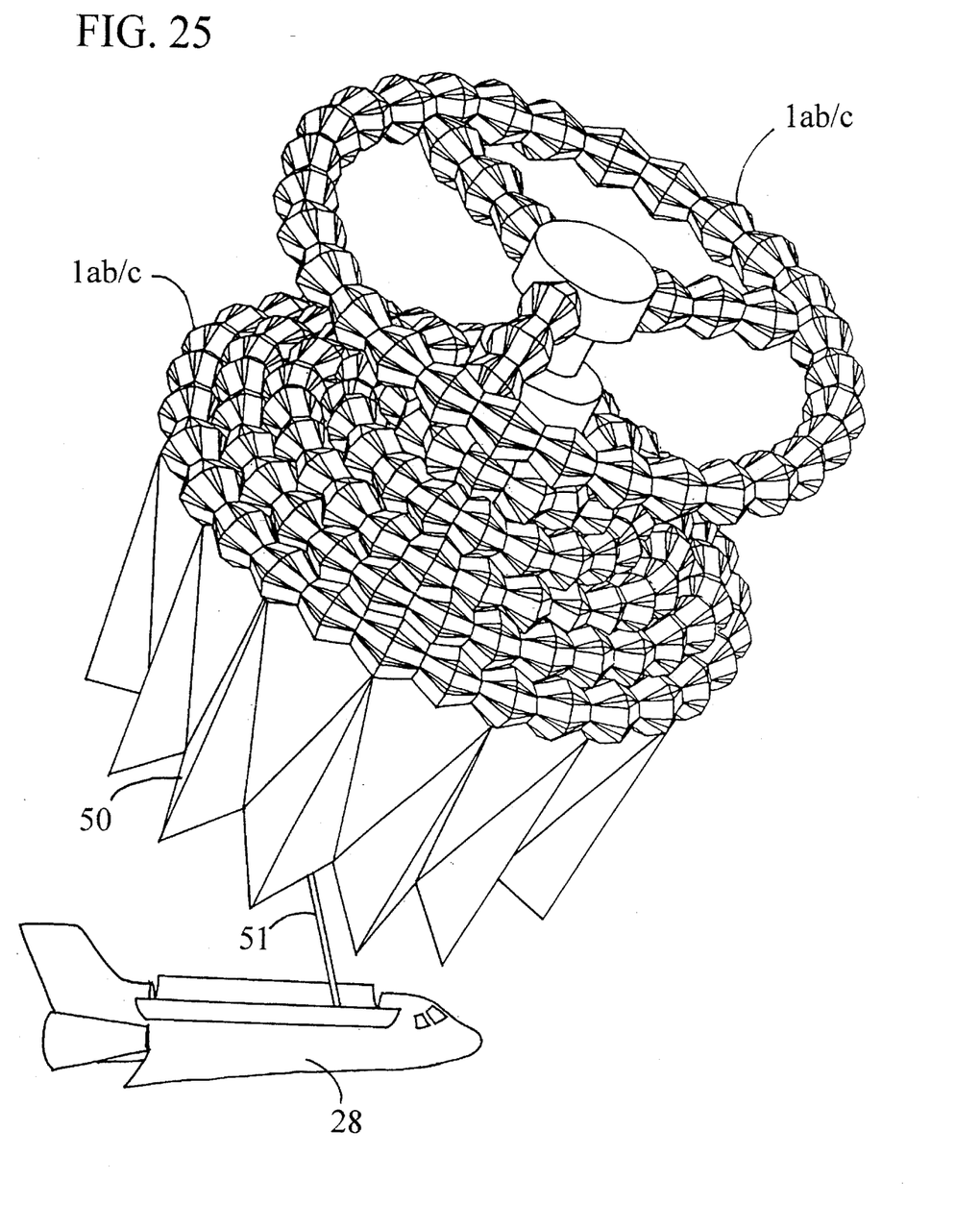
FIG. 25 is a view of a variation of pod module arrangement, forming a space station of different structural layout.

FIG. 25 shows another isometric view of a further space station shape, employing a rotating gravity wheel and spoke arrangement, attached to a conically shaped, stationary service station structure with a large retractable entrance port 50 and docking arm 51, for space shuttle docking.

Figure 26:
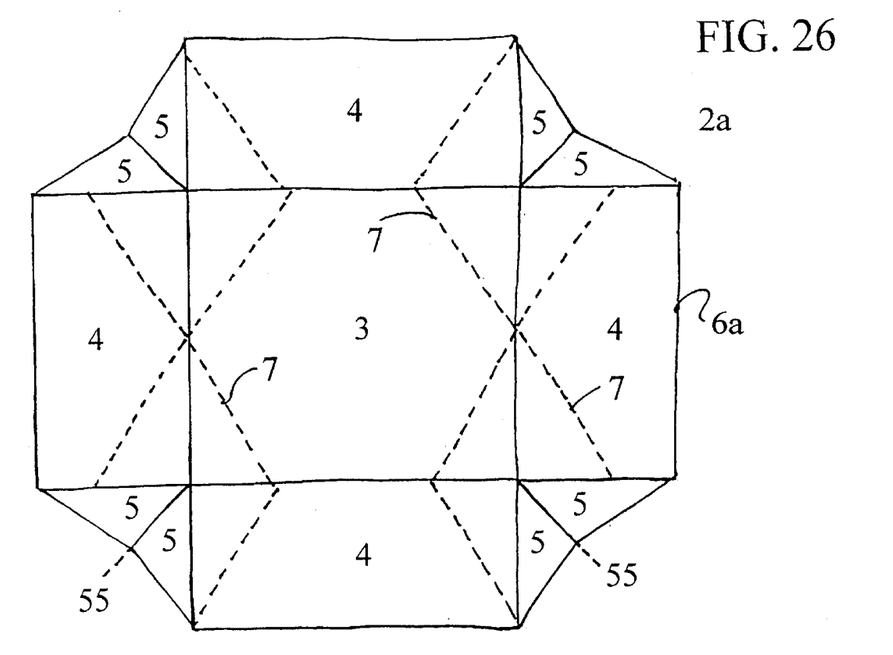
FIGS. 26, 27, and 28 is a view of a connector module allowing the connection of enclosure modules in various directions.
Figure 27:
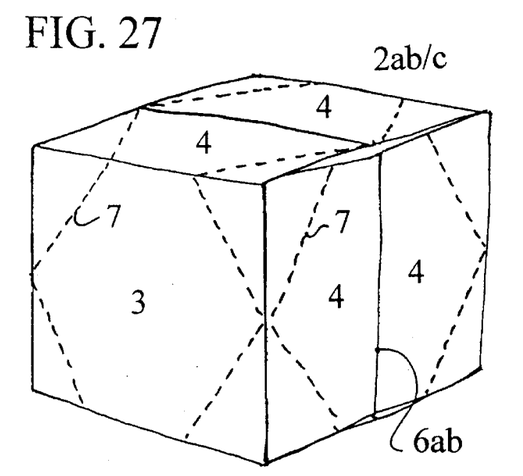
Figure 28:
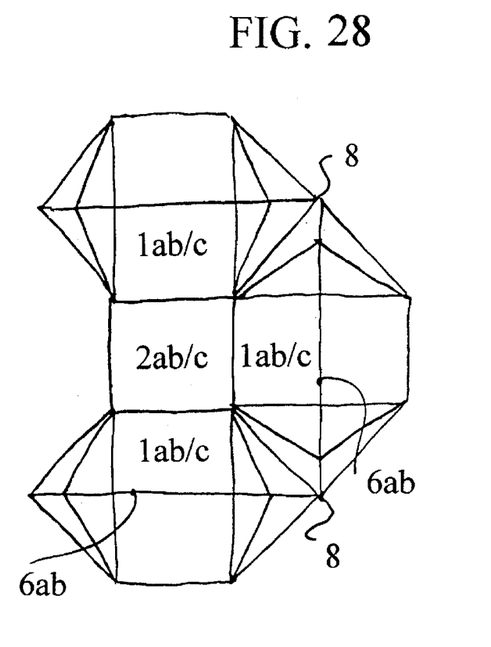

FIGS. 26 to 28 show a pod connector module in the general shape of a cube, which is employed in this method to connect enclosure modules 1ab/c at right angles to each other. Therefore in FIG. 26 is shown in front elevational view in its typical two dimensional state one half of a connector module 2a, consisting of its basic end wall 3, its four rectangular panels 4 and its eight triangles 5. Said connector module's seam 6a is attached to its matching seam 6b of the second half of the connector module, thereby forming seam 6ab. Indicator lines 7 indicate the location for the attachment of end walls 3 of a typical enclosure module 1ab/c, by marking the outline of said end walls 3. Such outlines are further indicated in FIG. 27, showing a connector module in its deployed mode, with folds 55 folded away and seam 6ab in its final location. FIG. 28 shows a configuration of enclosure modules 1ab/c in plan view, attached to connector module 2ab/c in its connecting function and how said enclosure modules 1ab/c may be connected for extra stability at their connecting walls 8.

A number of variations, as will occur to those skilled in the art, may be made to the before described pod module shapes without departing from the claimed scope of the invention. The contemplated pod modules may be employed as unitary enclosures or may be employed to form larger three dimensional hollow shapes.

It is further contemplated that each individual pod module may itself form a complete structure or alternatively be connected to other pod modules to have their interiors joined to one another by installing through-passage ports in the abutting walls of adjacent pod modules, forming a structure of a plurality of pod modules with their interiors in communication.

A variety of structural configurations and layouts comprising a plurality of pod modules are therefore included herewith for the purpose of demonstrating the principle and method of the present invention, but, it will nevertheless be understood, that no limitation of the scope of the present invention is thereby intended, such further modifications and alterations in the illustrated structural configurations and layouts, and such further applications of the principle of the invention as illustrated herein are being contemplated as would normally occur to one skilled in the art to which the invention relates.

I claim:

1. A method for the fabrication, delivery and assembly of modular structures in space, comprising a plurality of prefabricated, collapsible, multi-sided modular pod enclosures from lightweight laminated sheet material with significant structural integrity and high storage density, incorporating a series of structural folds as part of their surface structure to act as expansion joints to compensate for drastic temperature changes in outer space, transported into space inside the cargo bay of a space ascent vehicle, dispensed and expanded from a delivery apparatus and formed into voluminous structural enclosures by employing a series of interior guide cables and tension cables, and with such assembly work conducted in a pressurized environment, said method comprising the following steps:

(a) mounting a modular pod enclosure storage and delivery apparatus into the cargo bay of a space ascent vehicle;

(b) loading a plurality of modular pod enclosures in their storage mode, including their interior guide cables, onto said storage and delivery apparatus;

(c) transporting said modular pod enclosures by way of said space ascent vehicle to a selected location in space;

(d) operatively engaging said delivery apparatus to dispense said plurality of modular pod enclosures from their storage mode to their operative mode;

(e) manipulating the interior guide cable arrangement in order to form said plurality of expanded pod module enclosures into the desired structural configuration;

(f) locating and fastening the required guide cable stops and installing and tightening the tension cables in each pod module interior in order to lock each pod module enclosure securely into its operative mode;

(g) fabricating the desired structural space station shape from the plurality of pod module enclosure configurations.

2. The method of claim 1, wherein said modular enclosure module is constructed from two identical, two-dimensional parts of a sheet material, in the general shape of a multigon, matched and joined together along their peripheral edges by attaching a sealed, continuous hinge.

3. The method of claim 2, wherein each said multigon has a minimum of nine sides and wherein the surface of said multigon includes strategically located fold lines to divide each multigon into a matching geometrical layout.

4. The method of claim 3, wherein said geometrical layout of fold lines divides the surface of each multigon into at least ten separate but connected geometrical shapes, with each fold line performing as a continuous sealed hinge.

5. The method of claim 4, wherein said hinged fold lines are activated to fold and shape said matched parts from an enclosure with zero cubic volume into a multi-sided geometrical enclosure module with at least five sides, which surround substantial interior volume.

6. The method of claim 5, wherein at least three of said folds act as structural fold members of said enclosure module and at least one of said structural fold members acts as a structural expansion joint.

7. The method of claim 6, wherein at least one of said structural fold members is located in a direction to increase the interior volume of said enclosure module.

8. The method of claim 7, wherein all structural fold members are located in a direction to increase the interior volume of said enclosure module.

9. The method of claim 8, wherein at least one structural fold member is located in a direction to decrease the interior volume of said enclosure module.

10. The method of claim 9, wherein all structural fold members are located in a direction to decrease the interior volume of said enclosure module.

11. The method of claim 5, wherein said geometrical enclosure module is able to have its interior volume reduced up to a zero volume, by operating said folds in a reverse action and with zero volume representing its original storage mode.

12. The method of claim 11, wherein a plurality of said enclosure modules in their storage mode are nested into each other telescopically in generally parallel relation and fitted into the cargo bay of a space ascent vehicle for transport to a construction site in outer space.

13. The method of claim 1, wherein said space ascent vehicle is a rocket-propelled, re-usable shuttle type space ascent vehicle with its cargo bay equipped with an apparatus to store, dispense and expand a plurality of stored enclosure modules at a selected construction site in outer space.

14. The method of claim 13, wherein said apparatus comprises a storage member of hollow interior, extending generally the length of the ascent vehicle cargo bay, which said storage member is at its forward end connected inside the cargo bay to the flight cabin bulkhead by way of a mechanism which is able to maneuver said storage member from its module storage position to its module dispensing position and which is at its rearward end equipped with a mechanism which is able to dispense a plurality of stored enclosure modules from said storage member, expanding them from their storage mode to their voluminous operational mode.

15. The method of claim 14, wherein said storage member has its interior connected to the vehicle's flight cabin by way of a sealed entrance hatch, through which space construction workers enter the storage member interior in order to conduct the assembly of enclosure modules.

16. The method of claim 15, wherein the exterior dimensions of said storage member in cross section relate to an access opening included in the dividing walls of all enclosure modules, except for the end wall of the first enclosure module dispensed off the storage member, therewith accommodating the storage of enclosure modules onto the storage member.

17. The method of claim 16, wherein said storage member interior, together with the interiors of any enclosure modules being expanded from said storage member, is maintained at atmospheric pressure equal to that of the space ascent vehicle's flight cabin and wherein said enclosure modules in storage relation with the storage member comprise a sealed environment suitable to maintain said atmospheric pressure during the period of construction and thereafter.

18. The method of claim 1, wherein said plurality of enclosure modules are equipped with a guide cable system comprising at least three guide cables to direct said plurality of enclosure modules jointly into a predetermined pattern.

19. The method of claim 18, wherein said guide cables, extending in parallel from the end wall of the first enclosure module being dispensed off the storage member and continuing fitted through cable sleeves of all abutting or dividing walls of the required number of modules and extending to the end wall of the last enclosure module employed, are at a length suitable to form said unity of enclosure modules into their predesigned configuration.

20. The method of claim 19, wherein said guide cables are equipped with guide cable stops, which may be located along each guide cable at predetermined locations, for the guide cable sleeves and dividing walls to rest against as each enclosure module is being expanded, thereby aiding in the formation of a desired enclosure module configuration.

21. The method of claim 20, wherein each said enclosure module is expanded and maintained in its desired position through the installation of a tension cable located in the interior of each said expanded enclosure module, following generally the direction of the enclosure module's perimeter edge seam and with such cable placed through a series of strategically located rings or sleeves attached to said enclosure module's perimeter edge seam.

22. The method of claim 21 wherein said tension cable forms a closed loop and which when shortened, forces the two end walls of an enclosure module in opposite directions, along the interior guide cables, to rest against the installed guide cable stops, creating the necessary enclosure module surface tension to be of structural significance.

23. The method of claim 22, wherein said tension cable incorporates as part of its loop a mechanical tension device, operational to respond to a force by expanding or contracting the size of the tension cable loop, which optimizes the effectiveness of said enclosure module's structural expansion capability.

24. The method of claim 23, wherein said enclosure module forms a single space structure unit having a central area within it, the volume of which when such module is in its most expanded mode exceeds the volume of said enclosure module when in its nested storage.

\* \* \* \* \*